United States Patent

[11] 3,632,243

[72] Inventor Lambert H. Mott
c/o Mott Metallurgical Corp., P.O. Drawer "L", Farmington Industrial Park, Farmington, Conn. 06032
[21] Appl. No. 86,914
[22] Filed Nov. 4, 1970
[45] Patented Jan. 4, 1972
Continuation of application Ser. No. 729,696, May 16, 1968, now Patent No. 3,567,437. This application Nov. 4, 1970, Ser. No. 86,914

[54] APPARATUS FOR FORMING POROUS SEAMLESS TUBING
4 Claims, 10 Drawing Figs.
[52] U.S. Cl. .................................................. 425/78,
75/214, 249/144, 425/424
[51] Int. Cl. .................................................. B29c 5/00
[50] Field of Search .......................................... 18/42 R,
34, DIG. 10, 45 R; 249/142, 144

[56] References Cited
UNITED STATES PATENTS
1,198,621  9/1916  Davis .......................... 249/144 X
2,604,661  7/1952  Karns .......................... 18/DIG. 10
3,263,275  8/1966  McElroy ....................... 249/142 X
3,374,503  3/1968  Boniger ....................... 18/DIG. 10
3,524,619  8/1970  Natkins ....................... 249/142

Primary Examiner—J. Howard Flint, Jr.
Attorney—Peter L. Tailer

ABSTRACT: A spacer for use with a core rod, a flexible tubular mold disposed about the core rod, means introducing a powder between the core rod and the mold, and means sealing the ends of the tubular mold so that the powder may be compacted on subjecting the mold to fluid pressure, the compacted powder being removed and sintered to form porous seamless tubing; the spacer having a cylindrical outer shell larger in diameter than the inside of the mold, guide means sliding on the core rod and fixed to the shell positioning the shell concentrically about the core rod, the spacer containing at least one longitudinal opening allowing powder to flow therethrough, and handle means extending through the mold between the mold and the core rod so the spacer may be drawn upward through the tubular mold as powder flows through the opening in the spacer to be positioned about the core rod within the mold, the tubular mold on passage of the spacer contracting to hold powder against shifting.

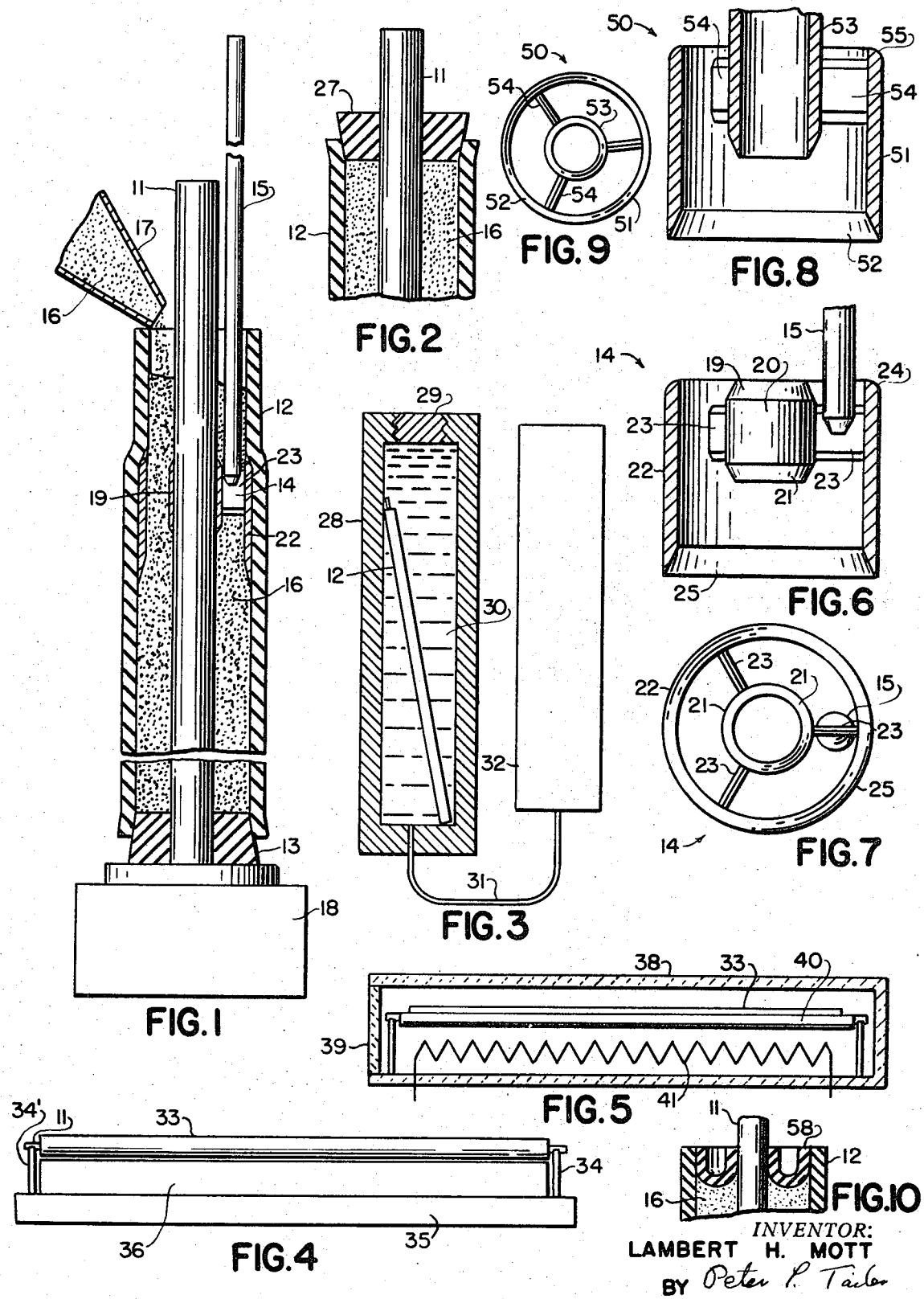

APPARATUS FOR FORMING POROUS SEAMLESS TUBING

CROSS REFERENCE TO RELATED APPLICATION

This application is a continuation-in-part of my application Ser. No. 729,696 filed May 16, 1968 now U.S. Pat. No. 3,567,437.

BACKGROUND OF THE INVENTION

High-fluid pressures have been used to compact metal powders in fluidtight resilient molds to form compacted porous objects which are thereafter sintered below the melting temperature of the metal powder to bond the powder grains and produce high-strength porous objects. To form porous seamless tubing in this manner, a flexible tubular mold of rubber, vinyl, or the like may serve as an outer mold which is placed about a core rod of steel, aluminum, glass, or the like. To provide some concentricity of the inside and outside diameters of the resulting seamless porous tubing, an exterior support containing apertures to admit fluid under pressure has been placed about the tubular flexible mold to hold it from the outside in a desired position in relation to the core rod. However, any irregularities in the wall thickness of the flexible tubular mold will result in lack of concentricity and give rise to thick and thin spots in the wall of the porous seamless tubing product. This can be particularly undesirable if the porous metal tubing is to be used for delicate filter applications or in other critical situations.

SUMMARY OF THE INVENTION

Metal powder is poured into a vertical flexible tubular mold containing a central core rod with the lower end of the tubular mold closed by a resilient stopper which is preferably entered by the core rod. A spacer slightly larger in diameter than the inside of the tubular mold with a lower knife edge and longitudinal openings for the free passage of powder therethrough is pulled upward through the powder filled tubular mold to evenly space powder about the core rod. When the spacer is removed, the upper end of the tubular mold is stopped with a resilient stopper and the tubular mold with core rod and powder therein is placed in a fluid and subjected to a pressure between 15,000 to 60,000 pounds per square inch to compact the metal powder. The tubular mold may then be removed from the fluid and the resulting compacted porous seamless tube may be removed from the tubular mold and have the core rod withdrawn from it. The porous tube is then sintered to form a length of porous metal tubing.

The spacer has a handle which extends upward for the length of the flexible tubular mold between the mold and the core rod so that the spacer can be drawn upward within the powder filled mold. The spacer should be slightly larger in diameter than the inside of the flexible tubular mold so that the tubular mold will contract about powder spaced about the core rod to hold the powder from shifting. This enables the powder filled mold to be moved and placed in a pressure vessel to subject it to high pressures without any shifting of the powder to cause wall thickness variations in the finished product.

This invention and the spacer used therewith provide higher tolerance in seamless porous tubing at a lower cost than would otherwise be possible. Further, since exterior supports are not required to support a tubular mold and position it about a core rod, less space is occupied in a pressure vessel in which the tubular molds are subjected to high-fluid pressures so that a given pressure vessel can be charged with a greater number of tubular molds at one time. In addition, this invention more easily lends itself to automatic production.

BRIEF DESCRIPTION OF THE DRAWING

FIG. 1 is a longitudinal, vertical section through a flexible tubular mold being positioned about a core rod by a spacer according to this invention, the tubular mold being on a vibrator and having metal powder poured therein, a portion of the tubular mold, powder and core rod being broken away and a portion of the spacer handle projecting from the tubular mold being broken away;

FIG. 2 is a longitudinal vertical section through a fragment of the upper portion of the tubular mold, powder, and core rod showing a stopper inserted therein after removal of the spacer;

FIG. 3 is a longitudinal vertical section through a hydrostatic pressure tank connected to a fluid pressure source and containing a metal powder filled tubular mold;

FIG. 4 is a front view of the test strand with a compacted porous tube on a core rod mounted thereon;

FIG. 5 is a longitudinal section through a sintering furnace with a compacted porous tube shown resting in a holder therein;

FIG. 6 is a longitudinal, vertical section through the outer shell of a spacer with its handle broken away;

FIG. 7 is a bottom view of the spacer of FIG. 6;

FIG. 8 is a longitudinal, vertical section through a modified spacer with its central tubular guide and handle broken away;

FIG. 9 is a bottom view of the spacer of FIG. 8; and

FIG. 10 is a longitudinal, vertical section through a modified tubular mold stopper shown positioned in a fragment of the end of a tubular mold.

DESCRIPTION OF THE PREFERRED EMBODIMENTS

This invention is carried out in the following manner. As shown in FIG. 1, a core rod 11, preferably of tool steel, is placed in a length of flexible tubing 12 which serves as a tubular mold. Mold 12 may be of rubber, vinyl, or any other flexible compression transmitting material. Rod 11 enters the rubber stopper 13 which closes the lower end of mold 12.

A spacer 14, as may be seen in FIGS. 6 and 7, is placed in the bottom of the tubular mold 12 directly above stopper 13 with its handle 15 extending upward about the top of mold 12. Metal powder 16 of a desired grain size is poured from a suitable source 17 into the top of mold 12 to fill the space between it and the core rod 11. Mold 12 may be placed on a vibrator 18 as spacer 14 is drawn upward in mold 12 by handle 15.

As may be further seen in FIGS. 6 and 7, spacer 14 has an inner guide ring 19 with beveled upper and lower edges 20 and 21 which allow guide ring 19 to slide upward precisely guided by core rod 11. An outer shell 22 is concentrically spaced from guide ring 19 by radial arms 23, one of which may have the rod handle 15 connected to it. The outer upper edge 24 of shell 22 may be rounded to slide upward in mold 12. The outer diameter of shell 22 is slightly larger than the inner diameter of tubular mold 12 to stretch it outward as spacer 14 is pulled upward. In some cases, it may be desirable to lubricate the inner surface of tubular mold 12 to facilitate the passage of shell 22. Small amounts of zinc sterate powder or the like may be used as a lubricant.

The lower edge of shell 22 terminates in an outward sloping inner bevel forming the knife edge 25. Thus, when spacer 14 is drawn upward, metal powder pours freely between guide ring 19 and shell 22 to pack around core rod 11 within knife edge 25 with an exact thickness about core rod 11. Contraction of the tubular mold 12 about powder 15 after passage of spacer 14 holds powder 16 firmly against shifting after the mold 12 is filled. The vibrator 18 may be used to assist in the free flow of metal powder 16 through the spacer 14 and compact it in the mold 12. However, excessive vibration will overly compact powder 16 above spacer 14 to prevent its smooth upward withdrawal.

Powder 16 should be added to mold 12 as spacer 14 is drawn upward to fill mold 12 completely and allow an upper stopper 27 to be placed in the upper end of mold 12 after spacer 14 is withdrawn. The fully charged mold 12, as shown in FIG. 2, is then ready for isostatic compaction.

As shown in FIG. 3, the charged mold 12 is placed in a pressure vessel 28 through opening 29 which is closed and sealed.

Fluid 30 is introduced therein through line 31 under pressure from any conventional source 32. As the tubular mold 12 is closed fluidtight about the core rod 11 by stoppers 27 and 13, fluid pressure is transmitted to the metal powder 16 to compact it sufficiently for it to hold its form. For stainless steel powders, pressures may be used between 15,000 and 60,000 pounds per square inch. This pressure causes a reduction of the outer diameter of the compacted metal powder. On release of pressure and removal from pressure vessel 28, the flexible tubular mold 12 may be easily removed from the resulting compacted porous seamless tube.

As shown in FIG. 4, concentricity of a compacted porous seamless tube 33 may be rapidly checked by supporting its transfixing core rod 11 by holders 34' and 34 upstanding from base 35. A straight edge gauge 36 on base 35 allows a rapid inspection of tube 33 for concentricity and outer surface irregularities as it is rotated.

Core 11 fits with slight clearance within the compacted tube 33 because the tube 33 expands to a small extent on release of hydrostatic pressure. Thus core rod 11 may be slid from tube 33 which, as shown in FIG. 5, is placed in a sintering oven 38 having a door 39. Tube 33 in oven 38 rests in a holder 40 or in a sandbox (not shown) so that it is supported along its entire length during sintering. Oven 38 may be heated by an electric element 41 or by any other means and should contain a reducing or inert atmosphere to prevent oxidation. The temperature and times for sintering different metal powders compacted to different degrees are well known in the art. The sintered tube 33 is removed from furnace 38 as a seamless porous tube, the end product for the process of this invention.

FIGS. 8 and 9 show a modified spacer 50 according to this invention. An outer shell 51 has a rounded upper edge 55 and an outwardly and downwardly sloping lower knife edge 52. A central tubular guide 53 slides on core 11 and extends upward to form the handle by means of which spacer 50 is withdrawn from tubular mold 12. Radial arms 54 support shell 51 concentrically at the lower end of the tubular guide 53.

FIG. 10 shows a modified stopper 58 which is a ring, U-shaped in section, to seal the ends of a tubular mold 12 about a core rod 11. The stoppers 58 or 13 and 27 must provide a fluidtight closure to enable fluid pressure to compact the powder 16.

While the spacer of this invention has been shown as having a central guide ring 19 or a central guide tube 53 which completely extends about the core rod 11, the central guide need only contact the core rod 11 in given places about its circumference to slide thereon and position the outer shell 22 or 51 in relation thereto. While a tubular handle 53 and a rod handle 15 have been shown to be used to withdraw spacers 50 and 14, any other type of handle could be used. Such a handle could be a flexible line, although a flexible line would be more difficult to pass through the tubular mold 12.

What is claimed is:

1. Apparatus for forming porous seamless tubing comprising, in combination, a core rod, a flexible tubular mold disposed about said core rod, means introducing a powder between said core rod and said tubular mold, means sealing the ends of said tubular mold so that powder introduced into said mold may be compacted on subjecting said mold to fluid pressure and the compacted powder may then be removed and sintered to form porous seamless tubing and a spacer having a cylindrical outer shell larger in diameter than said flexible tubular mold engaging the inside of said flexible tubular mold, guide means sliding on said core rod and fixed to said shell positioning the outer surface of said shell concentrically about said core rod, said spacer containing at least one longitudinal opening allowing powder to flow therethrough, and handle means extending through said tubular mold between said core rod and said tubular mold so that said spacer may be drawn upward through said tubular mold as powder flows through said spacer to be positioned evenly about said core rod, said spacer aligning said tubular mold in relation to said core rod, said tubular mold on passage of said spacer contracting holding said powder against shifting.

2. The combination according to claim 1 wherein said lower edge of said outer shell terminates in a knife edge.

3. The combination according to claim 3 wherein said guide means consists of a guide ring slidably extending about said core rod and with the addition of radial arms fixing said guide ring to said outer shell, said handle means being a rod fixed to said spacer.

4. The combination according to claim 3 wherein said guide means consists of a tubular guide slidably extending about said core rod and with the addition of radial arms fixing said tubular guide to said outer shell, said handle means being an upward extension of said tubular guide.

* * * * *